US010676199B2

(12) United States Patent
Hon et al.

(10) Patent No.: US 10,676,199 B2
(45) Date of Patent: Jun. 9, 2020

(54) PROPULSION SYSTEM FOR AN AIRCRAFT

(71) Applicant: General Electric Company, Schenectady, NY (US)

(72) Inventors: Robert Charles Hon, Fort Mitchell, KY (US); Michael Thomas Gansler, Mason, OH (US)

(73) Assignee: General Electric Company, Schenectady, NY (US)

( * ) Notice: Subject to any disclaimer, the term of this patent is extended or adjusted under 35 U.S.C. 154(b) by 415 days.

(21) Appl. No.: 15/619,673

(22) Filed: Jun. 12, 2017

(65) Prior Publication Data

US 2018/0354632 A1 Dec. 13, 2018

(51) Int. Cl.
*B64D 27/24* (2006.01)
*B64D 27/10* (2006.01)
(Continued)

(52) U.S. Cl.
CPC .............. *B64D 27/24* (2013.01); *B64D 27/02* (2013.01); *B64D 27/10* (2013.01); *B64D 31/06* (2013.01); *B64D 35/08* (2013.01); *F01D 15/10* (2013.01); *F02C 6/00* (2013.01); *F02C 6/14* (2013.01); *F02C 7/262* (2013.01); *F02C 7/268* (2013.01);
(Continued)

(58) Field of Classification Search
CPC ........ B64D 27/24; B64D 27/02; B64D 27/10; B64D 2027/026; B64D 31/06; B64D 31/02; B64D 35/08
See application file for complete search history.

(56) References Cited

U.S. PATENT DOCUMENTS

| 5,325,042 A | 6/1994 | Murugan |
|---|---|---|
| 6,979,979 B2 | 12/2005 | Xu et al. |

(Continued)

FOREIGN PATENT DOCUMENTS

| EP | 2 452 878 A2 | 5/2012 |
|---|---|---|
| EP | 2 985 901 A1 | 2/2016 |
| EP | 2 995 555 A1 | 3/2016 |

OTHER PUBLICATIONS

Canadian Office Action Corresponding to Application No. 3006678 dated Apr. 1, 2019.
(Continued)

*Primary Examiner* — Rodney A Bonnette
(74) *Attorney, Agent, or Firm* — Dority & Manning, P.A.

(57) ABSTRACT

A hybrid-electric propulsion system for an aircraft includes a propulsor and a turbomachine. The turbomachine includes a high pressure turbine drivingly coupled to a high pressure compressor through a high pressure spool. The hybrid electric propulsion system further includes an electrical system including a first electric machine, a second electric machine, and an electric energy storage unit electrically connectable to the first and second electric machines. The first electric machine is coupled to the high pressure spool of the turbomachine and the second electric machine is coupled to the propulsor for driving the propulsor to provide a propulsive benefit for the aircraft. The hybrid electric propulsion system also includes a controller configured to provide electrical power from an electric power source to the first electric machine to drive the first electric machine to start, or assist with starting, the turbomachine.

18 Claims, 8 Drawing Sheets

(51) Int. Cl.
  *B64D 35/08* (2006.01)
  *B64D 31/06* (2006.01)
  *B64D 27/02* (2006.01)
  *F02C 7/36* (2006.01)
  *F01D 15/10* (2006.01)
  *F02C 6/00* (2006.01)
  *F02C 7/262* (2006.01)
  *F02C 7/268* (2006.01)
  *F02K 5/00* (2006.01)
  *F02C 6/14* (2006.01)
  *B64D 31/02* (2006.01)

(52) U.S. Cl.
  CPC ................ *F02C 7/36* (2013.01); *F02K 5/00* (2013.01); *B64D 31/02* (2013.01); *B64D 2027/026* (2013.01); *F05D 2220/76* (2013.01)

(56) References Cited

U.S. PATENT DOCUMENTS

| | | | |
|---|---|---|---|
| 7,690,205 B2 | 4/2010 | Delaloye et al. | |
| 8,010,250 B2 | 8/2011 | Borumand et al. | |
| 9,051,881 B2 | 6/2015 | Bettner | |
| 9,157,372 B2 | 10/2015 | Sowden | |
| 9,428,267 B2 | 8/2016 | DeVita et al. | |
| 9,488,109 B2 | 11/2016 | Sowden | |
| 2014/0360205 A1* | 12/2014 | French | F01D 15/10 60/786 |
| 2015/0191250 A1* | 7/2015 | DeVita | B64C 27/12 701/3 |
| 2016/0176534 A1 | 6/2016 | Himmelmann et al. | |
| 2016/0214727 A1* | 7/2016 | Hamel | B64D 27/18 |
| 2016/0304211 A1 | 10/2016 | Swann | |
| 2016/0325629 A1 | 11/2016 | Siegel et al. | |
| 2017/0002744 A1 | 1/2017 | Poumarede et al. | |
| 2017/0057650 A1 | 3/2017 | Walter-Robinson | |
| 2018/0354631 A1* | 12/2018 | Adibhatla | F02K 5/00 |

OTHER PUBLICATIONS

Extended European Search Report and Opinion issued in connection with corresponding EP Application No. 18176967.0 dated Aug. 6, 2018.

* cited by examiner

PROPULSION SYSTEM FOR AN AIRCRAFT

FIELD

The present subject matter relates generally to a hybrid-electric aircraft propulsion system, and a method for starting a turbomachine within the hybrid-electric aircraft propulsion system.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is typically mounted to a respective one of the wings of the aircraft, such as in a suspended position beneath the wing, separated from the wing and fuselage.

Initially, the turbofan jet engines must be started. Additionally, it may be necessary to start, or more particularly to re-start, one or more of the turbofan jet engines during a flight in the event of an unscheduled shutdown of the turbofan jet engine. For example, the turbofan jet engine may shut down due to ice ingestions, bird strikes, inadvertent engine shutdown commanded by the flight crew, etc.

During an initial start, a starter system, such as a pneumatic starter, rotates the engine to a speed sufficient to initiate an ignition of a combustion section of the turbofan jet engine. With regard to mid-flight starts, there are currently at least two types. The first type of mid-flight engine start is an "assisted" start in which the engine is rotated by both an airflow through the engine and torque exerted by the starter system. The second type of mid-flight engine start is typically referred to as an "unassisted" start because the normal engine starter is not utilized to accelerate the engine. Instead, only ambient airflow through the engine generates torque that causes the engine to rotate, prior to lightoff, to a minimum speed. This torque associated with airflow through the engine is typically referred to as "windmilling" torque. The torque and resultant minimum pre-lightoff speed in the unassisted case are typically low relative to those obtained in an assisted start operation.

Assisted starts are typically preferred to unassisted starts because the additional starter torque allows the engine to achieve idle faster, more reliably and with less overall stress on the engine due to high exhaust gas temperatures, etc. Regardless, engines are required to start in an unassisted manner under certain conditions due to the unavailability of power to the starter system. In most cases the starter system is powered by pneumatic energy provided by either the other aircraft engine or by the Auxiliary Power Unit (APU). If neither is running or running efficiently, pneumatic power might not be available to the starter system and hence a restart must be of the unassisted type.

When performing an unassisted start, engine lightoff must occur at a minimum speed that is determined by the windmilling torque. This minimum speed is low relative to the assisted case, and accordingly the main fuel pump (which is driven through rotation of the core) is typically oversized to be able to provide sufficient fuel to start the engine at this minimum speed. Additionally, the lack of starter system torque in the unassisted case leads to higher internal temperatures, slower acceleration rates, and reduced compressor stall margin at any given acceleration rate when compared to an assisted start. The factors may reduce a likelihood of a successful start, increase a time required to perform the restart, and potentially decrease a lifespan of certain components within the engine due to elevated internal temperatures.

Similarly, during assisted starts, traditional starter systems often provide sub-optimal torque contribution due to the limited torque/power capacity of the starter system and lack of ability to operate the starter at speeds approaching or surpassing engine idle speed. This sub-optimal torque contribution is worsened during high altitude and in-flight starts, as the systems providing pneumatic power to the starter system normally experience a reduction in capacity when ambient pressure is reduced (i.e. when operating at higher altitudes).

Accordingly, a propulsion system having features providing for higher probability starting of a gas turbine engine, more efficient starting of a gas turbine engine, and/or quicker starting of a gas turbine engine would be useful.

BRIEF DESCRIPTION

Aspects and advantages of the invention will be set forth in part in the following description, or may be obvious from the description, or may be learned through practice of the invention.

In one exemplary embodiment of the present disclosure, a hybrid-electric propulsion system for an aircraft is provided. The hybrid electric propulsion system includes a propulsor and a turbomachine. The turbomachine includes a high pressure turbine drivingly coupled to a high pressure compressor through a high pressure spool. The hybrid electric propulsion system further includes an electrical system including a first electric machine, a second electric machine, and an electric energy storage unit electrically connectable to the first and second electric machines. The first electric machine is coupled to the high pressure spool of the turbomachine and the second electric machine is coupled to the propulsor for driving the propulsor to provide a propulsive benefit for the aircraft. The hybrid electric propulsion system also includes a controller configured to provide electrical power from an electric power source to the first electric machine to drive the first electric machine to start, or assist with starting, the turbomachine.

In certain exemplary embodiments the turbomachine is configured as part of a first turbofan engine, wherein the propulsor is configured as part of a second turbofan engine.

In certain exemplary embodiments the turbomachine is configured as part of a turbofan engine, wherein the propulsor is configured as part of an electric propulsor assembly.

In certain exemplary embodiments the high pressure turbine and the high pressure compressor at least partially define a core air flowpath, wherein the first electric machine is positioned inward of the core air flowpath.

In certain exemplary embodiments the electric power source is the electric energy storage unit, wherein the electric energy storage unit is selectively in electrical communication with both the first electric machine and the second electric machine.

In certain exemplary embodiments the controller is further configured to extract electrical power from the first electric machine during operation of the turbomachine, wherein the energy storage unit is configured to store at least about fifty kilowatt-hours of electrical power, and wherein the first electric machine is configured to generate at least about fifty kilowatts during operation of the turbomachine.

In certain exemplary embodiments energy storage unit is configured to store at least about sixty-five kilowatt-hours of electrical power.

In one exemplary aspect of the present disclosure, a method for starting a turbomachine of a hybrid-electric propulsion system of an aircraft is provided. The hybrid-electric propulsion system includes a propulsor, a turbomachine, and an electrical system, the electrical system including a first electric machine coupled to a high pressure system of the turbomachine, a second electric machine coupled to the propulsor, and an electric energy storage unit. The method includes receiving, by one or more computing devices, an engine start command; providing, by the one or more computing devices, electrical power from the electric energy storage unit to the first electric machine to drive the first electric machine and rotate a high pressure system of the turbomachine to at least a minimum threshold speed; initiating, by the one or more computing devices, an igniting of a combustor of a combustion section of the turbomachine once the high pressure system of the turbomachine is rotating at least at the minimum threshold speed; and providing, by the one or more computing devices, electrical power from the electric energy storage unit to the second electric machine to drive the propulsor and provide a propulsive benefit for the aircraft.

In certain exemplary aspects the minimum threshold speed is within about fifty-five percent of an idle speed of the turbomachine.

In certain exemplary aspects the engine start command is an engine restart command. For example, in certain exemplary aspects providing, by the one or more computing devices, electrical power from the electric energy storage unit to the first electric machine includes providing, by the one or more computing devices, electrical power from the electric energy storage unit to the first electric machine such that the first electric machine rotates the high pressure system of the turbomachine solely in combination with an ambient airflow through the turbomachine.

In certain exemplary aspects the energy storage unit is configured to store at least about fifty kilowatt hours of electrical power.

In another exemplary aspect of the present disclosure, a method for starting a turbomachine of a hybrid-electric propulsion system of an aircraft is provided. The hybrid-electric propulsion system includes a propulsor, a turbomachine, and an electrical system, the electrical system including a first electric machine coupled to a high pressure system of the turbomachine, a second electric machine coupled to the propulsor, and an electric energy storage unit. The method includes receiving, by one or more computing devices, an engine start command; receiving, by the one or more computing devices, data indicative of an engine start parameter value; providing, by the one or more computing devices, electrical power from the electric energy storage unit to the first electric machine to drive the first electric machine and rotate the high pressure system of the turbomachine in response to the received data indicative of the engine start parameter value; and initiating, by the one or more computing devices, an igniting of a combustor of a combustion section of the turbomachine.

In certain exemplary aspects the engine start parameter value is at least one of a core speed acceleration value, a core speed value, an exhaust gas temperature value, or a stall margin value.

In certain exemplary aspects providing, by the one or more computing devices, electrical power from the electric energy storage unit to the first electric machine includes modifying, by the one or more computing devices, an amount of electrical power provided from the electric energy storage unit to the first electric machine to drive the first electric machine and rotate the high pressure system of the turbomachine in response to the received data indicative of the engine start parameter value.

In certain exemplary aspects the engine start parameter value is a core speed acceleration value, wherein receiving, by the one or more computing devices, data indicative of the engine start parameter value includes determining, by the one or more computing devices, the core speed acceleration value is below a desired core speed acceleration threshold for startup, and wherein providing, by the one or more computing devices, electrical power from the electric energy storage unit to the first electric machine includes providing, by the one or more computing devices, electrical power from the electric energy storage unit to the first electric machine in response to determining the core speed acceleration value is below the desired core speed acceleration threshold for startup.

In certain exemplary aspects the engine start parameter value is an exhaust gas temperature value, wherein receiving, by the one or more computing devices, data indicative of the engine start parameter value includes determining, by the one or more computing devices, the exhaust gas temperature value is above a desired exhaust gas temperature threshold for startup, and wherein providing, by the one or more computing devices, electrical power from the electric energy storage unit to the first electric machine includes providing, by the one or more computing devices, electrical power from the electric energy storage unit to the first electric machine in response to determining the exhaust gas temperature value is above the desired core speed acceleration threshold for startup.

In certain exemplary aspects the engine start parameter value is a stall margin value, wherein receiving, by the one or more computing devices, data indicative of the engine start parameter value includes determining, by the one or more computing devices, the stall margin value is outside a desired stall margin range for startup, and wherein providing, by the one or more computing devices, electrical power from the electric energy storage unit to the first electric machine includes providing, by the one or more computing devices, electrical power from the electric energy storage unit to the first electric machine in response to determining the stall margin is outside the desired stall margin range for startup.

In certain exemplary aspects providing, by the one or more computing devices, electrical power from the electric energy storage unit to the first electric machine includes providing, by the one or more computing devices, electrical power from the electric energy storage unit to the first electric machine such that the high pressure system of the turbomachine is substantially completely rotated by the first electric machine.

In certain exemplary aspects the method further includes providing, by the one or more computing devices, electrical power from the electric energy storage unit to the second electric machine to drive the propulsor and provide a propulsive benefit for the aircraft.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
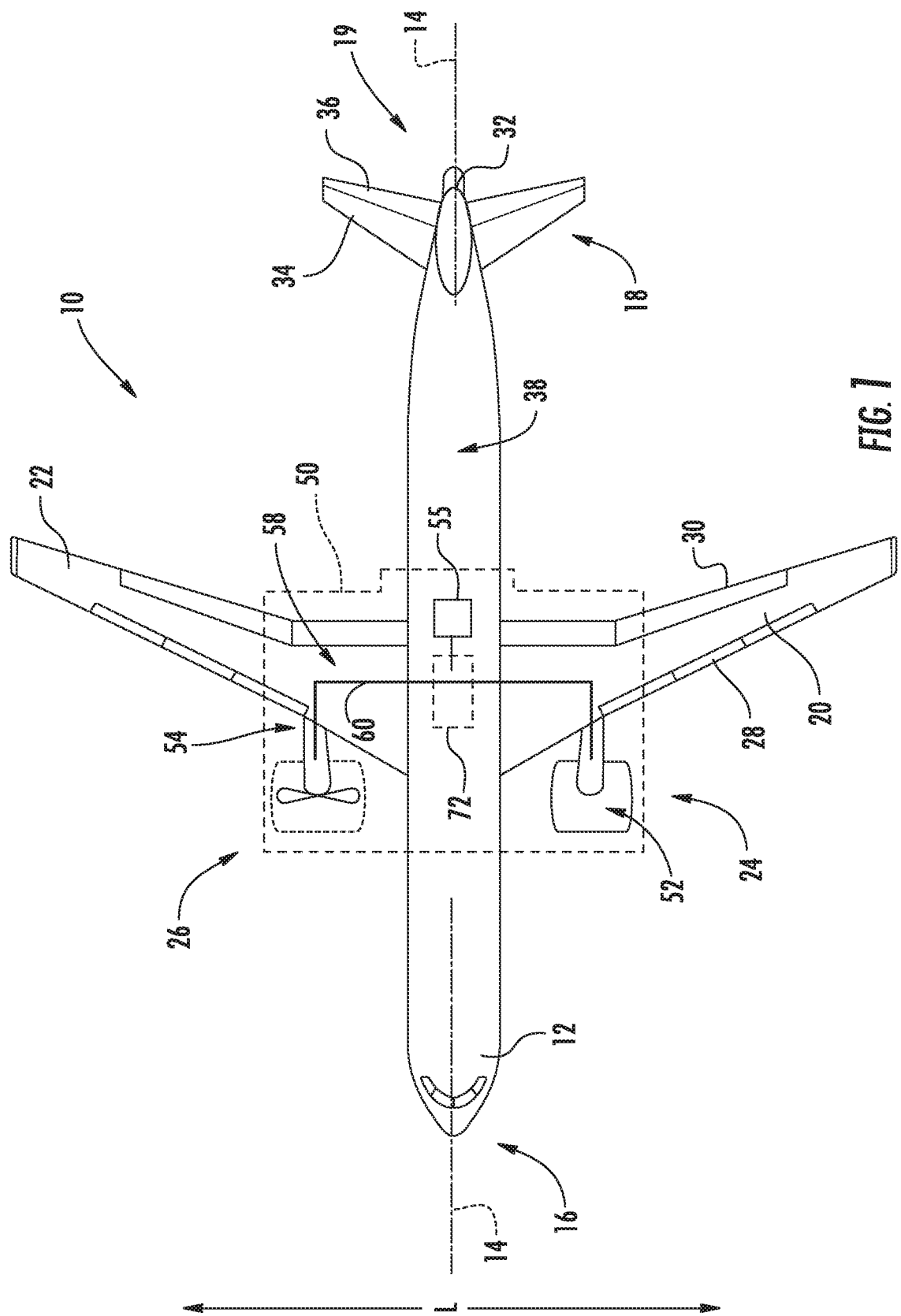
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to a hybrid electric propulsion system having a propulsor, a turbomachine, and an electrical system. The electrical system includes a first electric machine, a second electric machine, and an electric energy storage unit electrically connectable to the first and second electric machines. The first electric machine is coupled to a high pressure system of the turbomachine and the second electric machine is coupled to the propulsor for driving the propulsor to provide a propulsive benefit for the aircraft. For example, in certain exemplary embodiments, the turbomachine may be configured as part of a turbofan engine and the propulsor may be configured as part of an electric propulsor assembly (e.g., an electric fan). Alternatively, in other exemplary embodiments, the turbomachine may be configured as part of a first turbofan engine and the propulsor may be configured as part of a second turbofan engine. Alternatively, still, in other exemplary embodiments, the turbomachine and propulsor may be configured together as part of a turbofan engine. Further, in other exemplary embodiments these components may be configured as part of, e.g., turboprop engines, or any other suitable gas turbine engine.

In certain operations of the hybrid electric propulsion system, the turbomachine drives the first electric machine to produce electrical power, which is then provided to one or both of the electric energy storage unit or the second electric machine. The second electric machine receives electrical power, driving at least in part the propulsor. For example, the second electric machine may be configured to receive electrical power from one or both of the electric energy storage unit or first electric machine to drive a dedicated propulsor, such as a fan, and generate a propulsive benefit for the aircraft, such as thrust. In other operations of the hybrid electric propulsion system, electrical power stored within the electric energy storage unit may be redirected to the first electric machine to start or assist with starting the turbomachine.

For example, in certain exemplary aspects, electrical power from the electric energy storage unit may be redirected to the first electric machine to assist with a mid-air/mid-flight restart in response to an unscheduled shutdown of the turbomachine. With such an exemplary aspect, the method may rotate a high pressure system of the turbomachine with the first electric machine using power from the electric energy storage unit prior to initiating a re-ignition of the combustor of the combustion section. For example, in certain exemplary aspects, the method may rotate the high pressure system in such a manner up to a certain minimum threshold speed, to increase the likelihood of a successful restart and/or to prevent the turbomachine from operating within, for example, an exhaust gas temperature limit for the turbomachine. This minimum threshold speed may be relatively high given the capability of the first electric energy storage unit and the electric machine. Rotating the high pressure system up to the minimum threshold speed prior to initiating a restart may ensure that a sufficient amount of airflow is provided through the turbomachine to cool the turbomachine once the re-ignition is initiated, reducing, e.g., an exhaust gas temperature during such restart. Such may also allow for a reduction in fuel pump size, as the fuel pump may be rotatable with, or rather, rotatable by, the high pressure system.

Notably, in a similar manner, electrical power from the electric energy storage unit may be directed to the first electric machine to assist with an initial start of the turbomachine. Such may reduce a start time of the turbomachine, increase a likelihood of a successful start of the turbomachine, etc. with the initial start as well. Further, in one or more of the above situations, the first electric machine may provide torque in addition to a traditional starter system for the turbomachine, or alternatively, without the assistance of a traditional starter system for the turbomachine.

Moreover, in certain exemplary aspects, the hybrid electric propulsion system may add power to the high pressure system of the turbomachine through the first electric machine in response to one or more operational parameters of the turbomachine. For example, the method may add power to (or modulate an amount of power provided to) the high pressure system of the turbomachine in response to a core speed acceleration value, a core speed value, an exhaust gas temperature value, or a compressor stall margin value being outside a desired startup range.

Referring now to the drawings, wherein identical numerals indicate the same elements throughout the figures, FIG. 1 provides a top view of an exemplary aircraft 10 as may incorporate various embodiments of the present disclosure. As shown in FIG. 1, the aircraft 10 defines a longitudinal centerline 14 that extends therethrough, a lateral direction L, a forward end 16, and an aft end 18. Moreover, the aircraft 10 includes a fuselage 12, extending longitudinally from the forward end 16 of the aircraft 10 to the aft end 18 of the aircraft 10, and an empennage 19 at the aft end of the aircraft 10. Additionally, the aircraft 10 includes a wing assembly including a first, port side wing 20 and a second, starboard side wing 22. The first and second wings 20, 22 each extend laterally outward with respect to the longitudinal centerline 14. The first wing 20 and a portion of the fuselage 12 together define a first side 24 of the aircraft 10, and the second wing 22 and another portion of the fuselage 12 together define a second side 26 of the aircraft 10. For the embodiment depicted, the first side 24 of the aircraft 10 is configured as the port side of the aircraft 10, and the second side 26 of the aircraft 10 is configured as the starboard side of the aircraft 10.

Each of the wings 20, 22 for the exemplary embodiment depicted includes one or more leading edge flaps 28 and one or more trailing edge flaps 30. The aircraft 10 further includes, or rather, the empennage 19 of the aircraft 10 includes, a vertical stabilizer 32 having a rudder flap (not shown) for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration. For example, in other embodiments, the aircraft 10 may include any other configuration of stabilizer.

Figure 2:
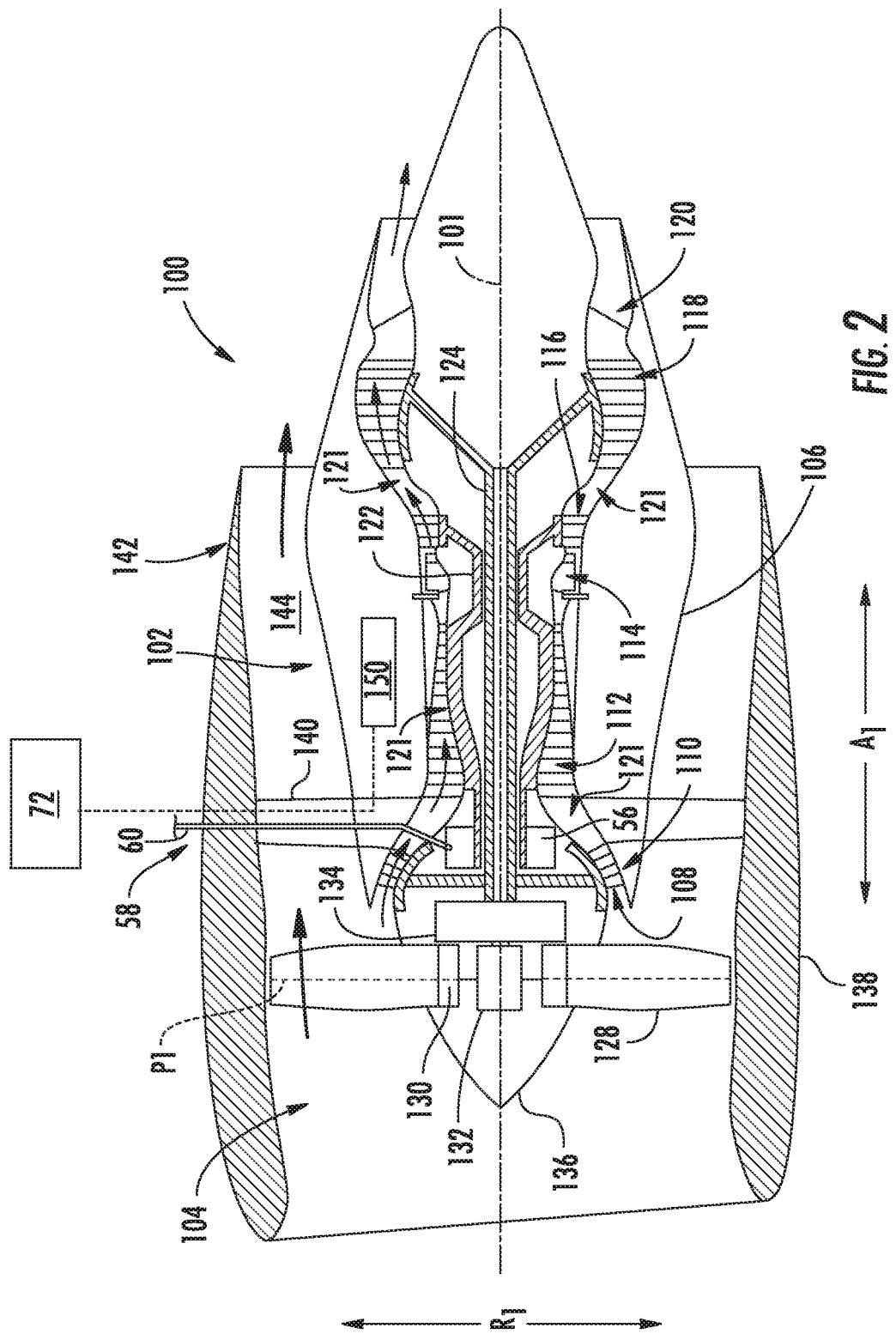
FIG. 2 is a schematic, cross-sectional view of a gas turbine engine mounted to the exemplary aircraft of FIG. 1.
Figure 3:
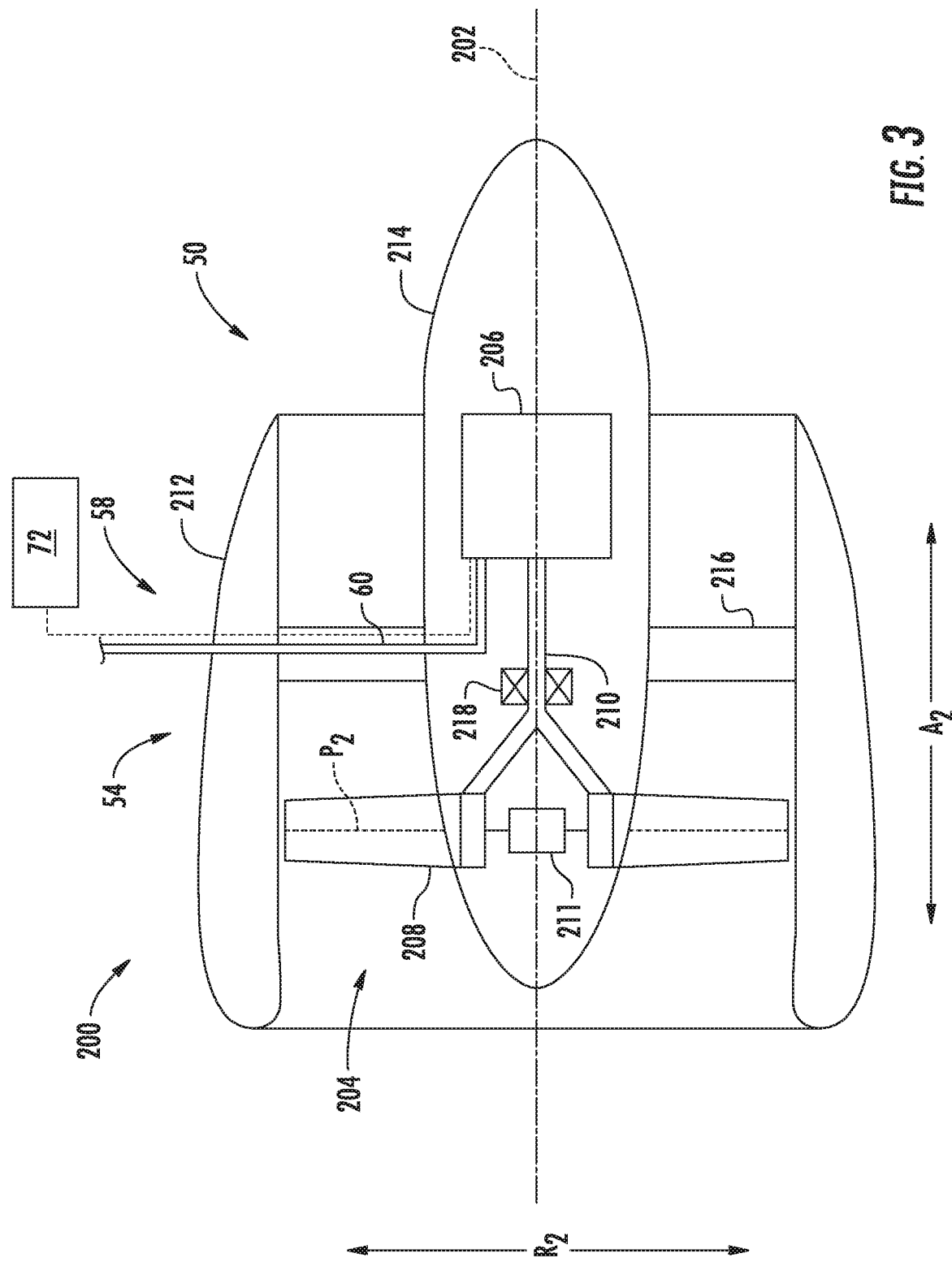
FIG. 3 is a schematic, cross-sectional view of an electric fan assembly in accordance with an exemplary embodiment of the present disclosure.

Referring now also to FIGS. 2 and 3, the exemplary aircraft 10 of FIG. 1 additionally includes a hybrid-electric propulsion system 50 having a first propulsor assembly 52 and a second propulsor assembly 54. FIG. 2 provides a schematic, cross-sectional view of the first propulsor assembly 52, and FIG. 3 provides a schematic, cross-sectional view of the second propulsor assembly 54. For the embodiment depicted, the first propulsor assembly 52 and second propulsor assembly 54 are each configured in an underwing-mounted configuration. However, as will be discussed below, one or both of the first and second propulsor assemblies 52, 54 may in other exemplary embodiments be mounted at any other suitable location.

Referring generally to FIGS. 1 through 3, the exemplary hybrid-electric propulsion system 50 generally includes the first propulsor assembly 52 having a combustion engine and a prime propulsor (which, for the embodiment of FIG. 2 are configured together as a turbofan engine 100), a first electric machine (which for the embodiment of FIG. 2 is a motor/generator 56) drivingly coupled to the combustion engine, the second propulsor assembly 54 having a propulsor and a second electric machine (i.e., the electric machine 206; the second propulsor assembly 54 for the embodiment of FIG. 3 being configured as an electric propulsor assembly 200), an electric energy storage unit 55, a controller 72, and a power bus 58. The first electric machine (i.e., the motor/generator 56 for the embodiment depicted), the second electric machine (i.e., the electric machine 206 incorporated into the second propulsor assembly 54), and the electric energy storage unit 55 may together be referred to herein as an electrical system of the hybrid-electric propulsion system 50. Additionally, the first electric machine, the second electric machine, and the electric energy storage unit 55 are each electrically connectable to one another through one or more electric lines 60 of the power bus 58. For example, the power bus 58 may include various switches or other power electronics movable to selectively electrically connect the various components of the hybrid electric propulsion system 50, and optionally to convert or condition such electrical power transferred therethrough.

As will be described in greater detail below, the controller 72 is generally configured to distribute electrical power between the various components of the hybrid-electric propulsion system 50. For example, the controller 72 may be operable with the power bus 58 (including the one or more switches or other power electronics) to provide electrical power to, or draw electrical power from, the various components to operate the hybrid electric propulsion system 50 in the various operating modes, including, e.g., a starting operating mode. Such is depicted schematically as the electric lines 60 of the power bus 58 extending through the controller 72. Accordingly, it will be appreciated that the electric machine 56, electric energy storage unit 55, and an electric motor 206 of the electric propulsor assembly 200 are each electrically connectable to one another, and more particularly are selectively in electrical communication with one another through operation of the controller 72.

The controller 72 may be a stand-alone controller, dedicated to the hybrid-electric propulsion system 50, or alternatively, may be incorporated into one or more of a main system controller for the aircraft 10, a separate controller for the exemplary turbofan engine 100 (such as a full authority digital engine control system for the turbofan engine 100, also referred to as a FADEC), etc.

Additionally, the electric energy storage unit 55 may be configured as one or more batteries, such as one or more lithium-ion batteries, or alternatively may be configured as any other suitable electrical energy storage devices. It will be appreciated that for the hybrid-electric propulsion system 50 described herein, the electric energy storage unit 55 is configured to store a relatively large amount of electrical power. For example, in certain exemplary embodiments, the electric energy storage unit may be configured to store at least about fifty kilowatt hours of electrical power, such as at least about sixty-five kilowatt hours of electrical power, such as at least about seventy-five kilowatts hours of electrical power, and up to about five hundred kilowatt hours of electrical power.

Referring now particularly to FIGS. 1 and 2, the first propulsor assembly 52 includes a combustion engine mounted, or configured to be mounted, to the first wing 20 of the aircraft 10. More specifically, as is depicted, for the embodiment of FIG. 2, the combustion engine is a turbomachine 102, and the first propulsor assembly 52 additionally includes a prime propulsor, or rather a primary fan (referred to simply as "fan 104" with reference to FIG. 2). Accordingly, for the embodiment depicted the turbomachine 102 and the fan 104 are configured together as part of a turbofan engine 100.

As shown in FIG. 2, the turbofan 100 defines an axial direction A1 (extending parallel to a longitudinal centerline 101 provided for reference) and a radial direction R1. As stated, the turbofan 100 includes the fan 104 and the turbomachine 102 disposed downstream from the fan 104.

The exemplary turbomachine 102 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a first, high pressure (HP) turbine 116 and a second, low pressure (LP) turbine 118; and a jet exhaust nozzle section 120. The compressor section, combustion section 114, and turbine section together define at least in part a core air flowpath 121.

The exemplary turbomachine 102 of the turbofan 100 additionally includes one or more shafts rotatable with at least a portion of the turbine section and, for the embodiment depicted, at least a portion of the compressor section. More particularly, for the embodiment depicted, the turbofan 100 includes a high pressure (HP) shaft or spool 122, which drivingly connects the HP turbine 116 to the HP compressor 112. Additionally, the exemplary turbofan 100 includes a low pressure (LP) shaft or spool 124, which drivingly connects the LP turbine 118 to the LP compressor 110.

Further, the exemplary fan 104 depicted is configured as a variable pitch fan having a plurality of fan blades 128 coupled to a disk 130 in a spaced apart manner. The fan blades 128 extend outwardly from disk 130 generally along the radial direction R1. Each fan blade 128 is rotatable relative to the disk 130 about a respective pitch axis P1 by virtue of the fan blades 128 being operatively coupled to a suitable actuation member 132 configured to collectively vary the pitch of the fan blades 128. The fan 104 is mechanically coupled to the LP shaft 124, such that the fan 104 is mechanically driven by the second, LP turbine 118. More particularly, the fan 104, including the fan blades 128, disk 130, and actuation member 132, is mechanically coupled to the LP shaft 124 through a power gearbox 134, and is rotatable about the longitudinal axis 101 by the LP shaft 124 across the power gear box 134. The power gear box 134 includes a plurality of gears for stepping down the rotational speed of the LP shaft 124 to a more efficient rotational fan speed. Accordingly, the fan 104 is powered by an LP system (including the LP turbine 118) of the turbomachine 102.

Referring still to the exemplary embodiment of FIG. 2, the disk 130 is covered by rotatable front hub 136 aerodynamically contoured to promote an airflow through the plurality of fan blades 128. Additionally, the turbofan 100 includes an annular fan casing or outer nacelle 138 that circumferentially surrounds the fan 104 and/or at least a portion of the turbomachine 102. Accordingly, the exemplary turbofan 100 depicted may be referred to as a "ducted" turbofan engine. Moreover, the nacelle 138 is supported relative to the turbomachine 102 by a plurality of circumferentially-spaced outlet guide vanes 140. A downstream section 142 of the nacelle 138 extends over an outer portion of the turbomachine 102 so as to define a bypass airflow passage 144 therebetween.

Referring still to FIG. 2, the hybrid-electric propulsion system 50 additionally includes an electric machine, which for the embodiment depicted is configured as an electric motor/generator 56. The electric motor/generator 56 is, for the embodiment depicted, positioned within the turbomachine 102 of the turbofan engine 100 and is in mechanical communication with one of the shafts of the turbofan engine 100. More specifically, for the embodiment depicted, the electric motor/generator 56 is positioned inward of the core air flowpath 121 and is driven by the first, HP turbine 116 through the HP shaft 122. The electric motor/generator 56 is configured to convert mechanical power of the HP shaft 122 to electric power during certain operations, and further is configured to convert electrical power to mechanical power in other operations. Accordingly, the electric motor/generator 56 may be powered by the HP system (including the HP turbine 116) of the turbomachine 102 during certain operations and may power the HP system during other operations.

Notably, the electric motor/generator 56 may be a relatively powerful motor/generator. For example, during certain operations, the motor/generator 56 may be configured to generate at least about fifty kilowatts of electrical power or at least about sixty-five horsepower of mechanical power.

It should be appreciated, however, that in other exemplary embodiments, the electric motor/generator 56 may instead be positioned at any other suitable location within the turbomachine 102 or elsewhere, and may be, e.g., powered in any other suitable manner. For example, the electric motor/generator 56 may be, in other embodiments, mounted coaxially with the HP shaft 122 within the turbine section, or alternatively may be offset from the HP shaft 122 and driven through a suitable gear train. Additionally, or alternatively, in other exemplary embodiments, the electric motor/generator 56 may instead be powered by both the LP system (e.g., the LP shaft 124) and the HP system (e.g., the HP shaft 122) via a dual drive system. Additionally, or alternatively, still, in other embodiments, the electric motor/generator 56 may include a plurality of electric motor/generators, e.g., with one being drivingly connected to the LP system (e.g., the LP shaft 124) and one being drivingly connected to the HP system (e.g., the HP shaft 122).

It should further be appreciated that the exemplary turbofan engine 100 depicted in FIG. 2 may, in other exemplary embodiments, have any other suitable configuration. For example, in other exemplary embodiments, the fan 104 may not be a variable pitch fan, and further, in other exemplary embodiments, the LP shaft 124 may be directly mechanically coupled to the fan 104 (i.e., the turbofan engine 100 may not include the gearbox 134). Further, it should be appreciated that in other exemplary embodiments, the first propulsor assembly 52 may include any other suitable type of engine. For example, in other embodiments, the turbofan engine 100 may instead be configured as a turboprop engine or an unducted turbofan engine. Additionally, in still other embodiments, the turbofan engine 100 may instead be configured as any other suitable combustion engine for driving the electric motor/generator 56. For example, in other embodiments, the turbofan engine may be configured as a turboshaft engine, or any other suitable combustion engine.

Referring still to FIGS. 1 and 2, the turbofan engine 100 further includes a controller 150, and although not depicted, one or more sensors. The controller 150 may be a full authority digital engine control system, also referred to as a FADEC. The controller 150 of the turbofan engine 100 may be configured to control operation of, e.g., the actuation member 132, a fuel delivery system to the combustion section 114 (not shown), etc. Additionally, the controller 150 may be operably connected to the one or more sensors to receive data from the sensors and determine various operational parameters of the turbofan engine 100. For example, the controller 150 may determine one or more of an exhaust gas temperature, a rotational speed of the core (i.e., a rotational speed of the HP system), a compressor discharge temperature, etc. Further, referring back also to FIG. 1, the controller 150 of the turbofan engine 100 is operably connected to the controller 72 of the hybrid-electric propulsion system 50. Moreover, as will be appreciated, the controller 72 may further be operably connected to one or more of the first propulsor assembly 52, the electric motor/generator 56, the second propulsor assembly 54, and the energy storage unit 55 through a suitable wired or wireless communication system (depicted in phantom).

Referring now particularly to FIGS. 1 and 3, as previously stated the exemplary hybrid-electric propulsion system 50 additionally includes the second propulsor assembly 54 mounted, for the embodiment depicted, to the second wing 22 of the aircraft 10. Referring particularly to FIG. 3, the second propulsor assembly 54 is generally configured as an electric propulsor assembly 200 including an electric motor 206 and a propulsor/fan 204. The electric propulsor assembly 200 defines an axial direction A2 extending along a longitudinal centerline axis 202 that extends therethrough for reference, as well as a radial direction R2. For the embodiment depicted, the fan 204 is rotatable about the centerline axis 202 by the electric motor 206.

The fan 204 includes a plurality of fan blades 208 and a fan shaft 210. The plurality of fan blades 208 are attached to/rotatable with the fan shaft 210 and spaced generally along a circumferential direction of the electric propulsor assembly 200 (not shown). In certain exemplary embodiments, the plurality of fan blades 208 may be attached in a fixed manner to the fan shaft 210, or alternatively, the plurality of fan blades 208 may be rotatable relative to the fan shaft 210, such as in the embodiment depicted. For example, the plurality of fan blades 208 each define a respective pitch axis P2, and for the embodiment depicted are attached to the fan shaft 210 such that a pitch of each of the plurality of fan blades 208 may be changed, e.g., in unison, by a pitch change mechanism 211. Changing the pitch of the plurality of fan blades 208 may increase an efficiency of the second propulsor assembly 54 and/or may allow the second propulsor assembly 54 to achieve a desired thrust profile. With such an exemplary embodiment, the fan 204 may be referred to as a variable pitch fan.

Moreover, for the embodiment depicted, the electric propulsor assembly 200 depicted additionally includes a fan casing or outer nacelle 212, attached to a core 214 of the electric propulsor assembly 200 through one or more struts or outlet guide vanes 216. For the embodiment depicted, the outer nacelle 212 substantially completely surrounds the fan 204, and particularly the plurality of fan blades 208. Accordingly, for the embodiment depicted, the electric propulsor assembly 200 may be referred to as a ducted electric fan.

Referring still particularly to FIG. 3, the fan shaft 210 is mechanically coupled to the electric motor 206 within the core 214, such that the electric motor 206 drives the fan 204 through the fan shaft 210. The fan shaft 210 is supported by one or more bearings 218, such as one or more roller bearings, ball bearings, or any other suitable bearings. Additionally, the electric motor 206 may be an inrunner electric motor (i.e., including a rotor positioned radially inward of a stator), or alternatively may be an outrunner electric motor (i.e., including a stator positioned radially inward of a rotor), or alternatively, still, may be an axial flux electric motor (i.e., with the rotor neither outside the stator nor inside the stator, but rather offset from it along the axis of the electric motor).

As briefly noted above, the electric power source (e.g., the electric motor/generator 56 or the electric energy storage unit 55) is electrically connected with the electric propulsor assembly 200 (i.e., the electric motor 206) for providing electrical power to the electric propulsor assembly 200. More particularly, the electric motor 206 is in electrical communication with the electric motor/generator 56 through the electrical power bus 58, and more particularly through the one or more electrical cables or lines 60 extending therebetween.

It should be appreciated, however, that in other exemplary embodiments the exemplary hybrid-electric propulsion system 50 may have any other suitable configuration, and further, may be integrated into an aircraft 10 in any other suitable manner. For example, in other exemplary embodiments, the electric propulsor assembly 200 of the hybrid electric propulsion system 50 may instead be configured as a plurality of electric propulsor assemblies 200 and/or the hybrid electric propulsion system 50 may further include a plurality of combustion engines (such as turbomachines 102) and electric motor/generators 56. Further, in other exemplary embodiments, the electric propulsor assembly(ies) 200 and/or combustion engine(s) and electric motor/generator(s) 56 may be mounted to the aircraft 10 at any other suitable location in any other suitable manner (including, e.g., tail mounted configurations).

Figure 4:
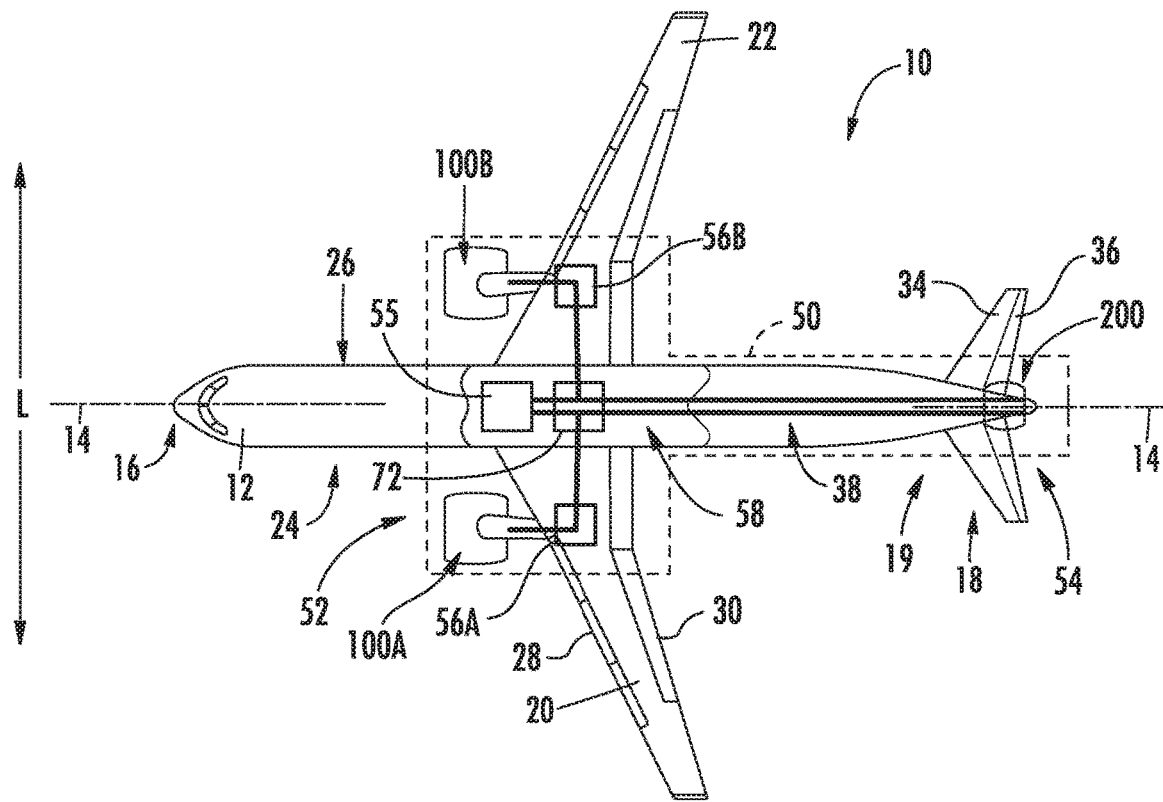
FIG. 4 is a top view of an aircraft including a propulsion system in accordance with another exemplary embodiment of the present disclosure.
Figure 5:
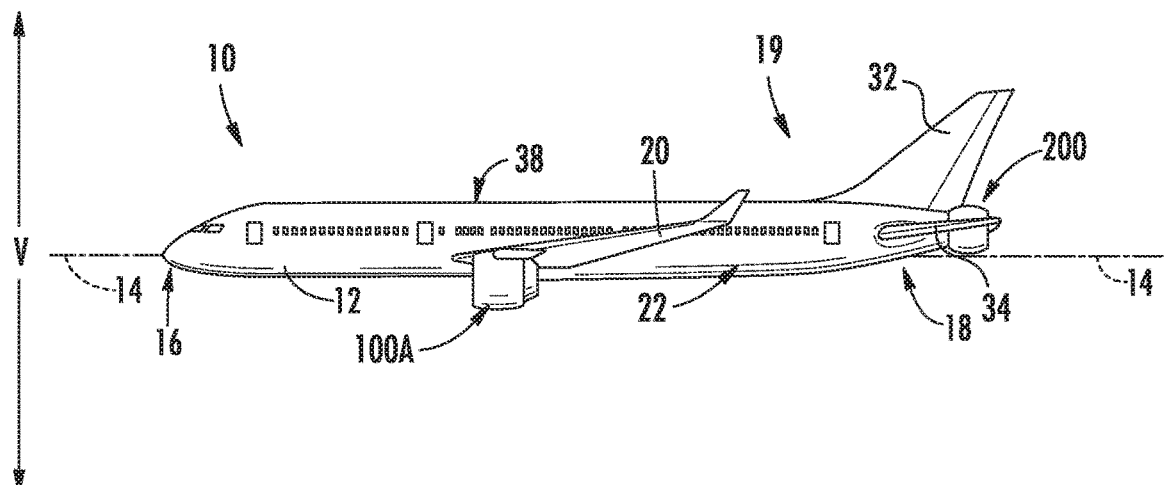
FIG. 5 is a port side view of the exemplary aircraft of FIG. 4.

For example, referring now to FIGS. 4 and 5, an aircraft 10 and hybrid-electric propulsion system 50 in accordance with still another exemplary embodiment of the present disclosure is depicted. The exemplary aircraft 10 and hybrid-electric propulsion system 50 of FIGS. 4 and 5 may be configured in substantially the same manner as exemplary aircraft 10 and hybrid-electric propulsion system 50 of FIGS. 1 through 3, and accordingly, the same or similar numbers may refer to same or similar parts.

For example, the exemplary aircraft 10 of FIGS. 4 and 5 generally includes a fuselage 12, an empennage 19, an electric energy storage unit 55, a first wing 20, and a second wing 22. Additionally, the hybrid-electric propulsion system 50 includes a first propulsor assembly 52 and a second propulsor assembly 54. An electrical system of the hybrid-electric propulsion system 50 includes one or more electric machines (e.g., electric machines 56A, 56B, discussed below) mechanically coupled to the first propulsor assembly 52 and one or more electric machines (not shown) coupled to a propulsor (not shown) integrated into the second propulsor assembly 54. For the embodiment depicted, it will be appreciated that the second propulsor assembly 54 is configured as an electric propulsor assembly 200. The electric machines 56A, 56B and are electrically connected to, and configured to provide electrical power to, the second propulsor assembly 54 and/or the electric energy storage unit 55 via an electric power bus 58.

However, for the embodiment of FIGS. 4 and 5, the first propulsor assembly 52 further includes a plurality of aircraft engines, configured as a first turbofan engine 100A and a second turbofan engine 100B, respectively. For example, turbofan engines 100A, 100B may be configured in substantially the same manner as the exemplary turbofan engine 100 of FIG. 2, or alternatively as any other suitable type of turbine engine, attached to and suspended beneath the wings 20, 22 in an under-wing configuration. Additionally, for the embodiment of FIGS. 4 and 5, the hybrid-electric propulsion system 50 further includes one or more electric machines operable with each of the turbofan engines 100A, 100B. More specifically, for the embodiment depicted, the hybrid-electric propulsion system 50 further includes a first electric motor/generator 56A operable with the turbofan engine 100A and a second electric motor/generator 56B operable with the second turbofan engine 100B. Although depicted schematically outside the respective turbofan engines 100A, 100B, in certain embodiments, the electric motor/generators 56A, 56B may be positioned within a respective one of the turbofan engines 100A, 100B (see, e.g., FIG. 2).

Further, for the embodiment of FIGS. 4 and 5, the hybrid electric propulsion assembly 50 includes the second propulsor assembly 54, which is configured as an electric propulsor assembly 200 mounted (or configured to be mounted) at the aft end 18 of the aircraft 10 to at least one of the empennage 19 of the aircraft 10 or the fuselage 12 of the aircraft. Hence, the electric propulsor assembly 200 depicted may be referred to as an "aft engine." More specifically, the exemplary electric propulsor assembly 200 depicted is mounted to the fuselage 12 of the aircraft 10 at the aft end 18 of the aircraft 10 and configured to ingest and consume air forming a boundary layer over the fuselage 12 of the aircraft 10. Accordingly, the exemplary electric propulsor assembly 200 depicted in FIGS. 4 and 5 may also be referred to as a boundary layer ingestion (BLI) fan. The electric propulsor assembly 200 is mounted to the aircraft 10 at a location aft of the wings 20, 22 and/or the turbofan engines 100A, 100B. Specifically, for the embodiment depicted, the electric propulsor assembly 200 is fixedly connected to the fuselage 12 at the aft end 18, such that the electric propulsor assembly 200 is incorporated into or blended with a tail section at the aft end 18.

Moreover, for the embodiment of FIGS. 4 and 5 the hybrid electric propulsion assembly 50 further includes a controller 72. Additionally, as briefly mentioned above, the electric propulsor assembly 200 includes a propulsor and an electric machine (i.e., of an electrical system of the hybrid electric propulsion system 50) integrated therein. The electric machine is electrically connectable to one or more of the first and second electric motor/generators 56A, 56B, and with the electric energy storage device 55. As will be appreciated, the energy storage unit 55 may be configured, in certain operating conditions, to receive electrical power from one or both of the first electric motor/generator 56A and the second electric motor/generator 56B, and may further be configured in certain operating conditions to provide stored electrical power to the electric propulsor assembly 200. Additionally, or alternatively, still, the energy storage unit 55 may be configured to provide stored electrical power to one or both of the motor/generators 56A, 56B in certain operations. Moreover, the controller 72 is operably connected to turbofan engines 100A, 100B, electric motor/generators 56A, 56B, electric propulsor assembly 200, and energy storage unit 55 to, e.g., control operations of the hybrid electric propulsion system 50 and selectively electrically connect components of the hybrid electric propulsion system 50 during the various operating conditions.

For example, during flight operations of the embodiment of FIGS. 4 and 5, the electric machine integrated into the electric propulsor assembly 200 may receive electrical power from one or more of the electric motor/generators 56A, 56B and the electric energy storage device 55 to drive the propulsor integrated into the electric propulsor assembly 200 to provide a propulsive benefit for the aircraft 10. For example, in such a manner the electric propulsor assembly 200 may reenergize a boundary layer airflow, reducing a drag on the aircraft 10, and potentially providing additional thrust for the aircraft 10.

It should be appreciated, however, that in still other exemplary embodiments of the present disclosure, any other suitable aircraft 10 may be provided having a hybrid-electric propulsion system 50 configured in any other suitable manner. For example, in other embodiments, the turbofan engines 100A, 100B may each be configured as any other suitable combustion engine (e.g., turboprop engine, unducted turbofan engine, turboshaft engine, turbojet engine, etc.). Additionally, in other embodiments the electric propulsor assembly 200 may be incorporated into the fuselage of the aircraft 10, and thus configured as a "podded engine," or pod-installation engine. Further, in still other embodiments, the electric propulsor assembly 200 may be incorporated into a wing of the aircraft 10, and thus may be configured as a "blended wing engine."

Moreover, in still other exemplary embodiments, the exemplary hybrid electric propulsion system 50 may have still other configurations. For example, referring now briefly to FIG. 6, a schematic diagram of a hybrid-electric propulsion system 50 in accordance with yet another exemplary embodiment of the present disclosure is provided. The exemplary hybrid electric system hybrid electric propulsion system 50 depicted in FIG. 6 may be similar to one or more the exemplary hybrid electric propulsion systems 50 described above with reference to FIGS. 1 through 5.

Figure 6:
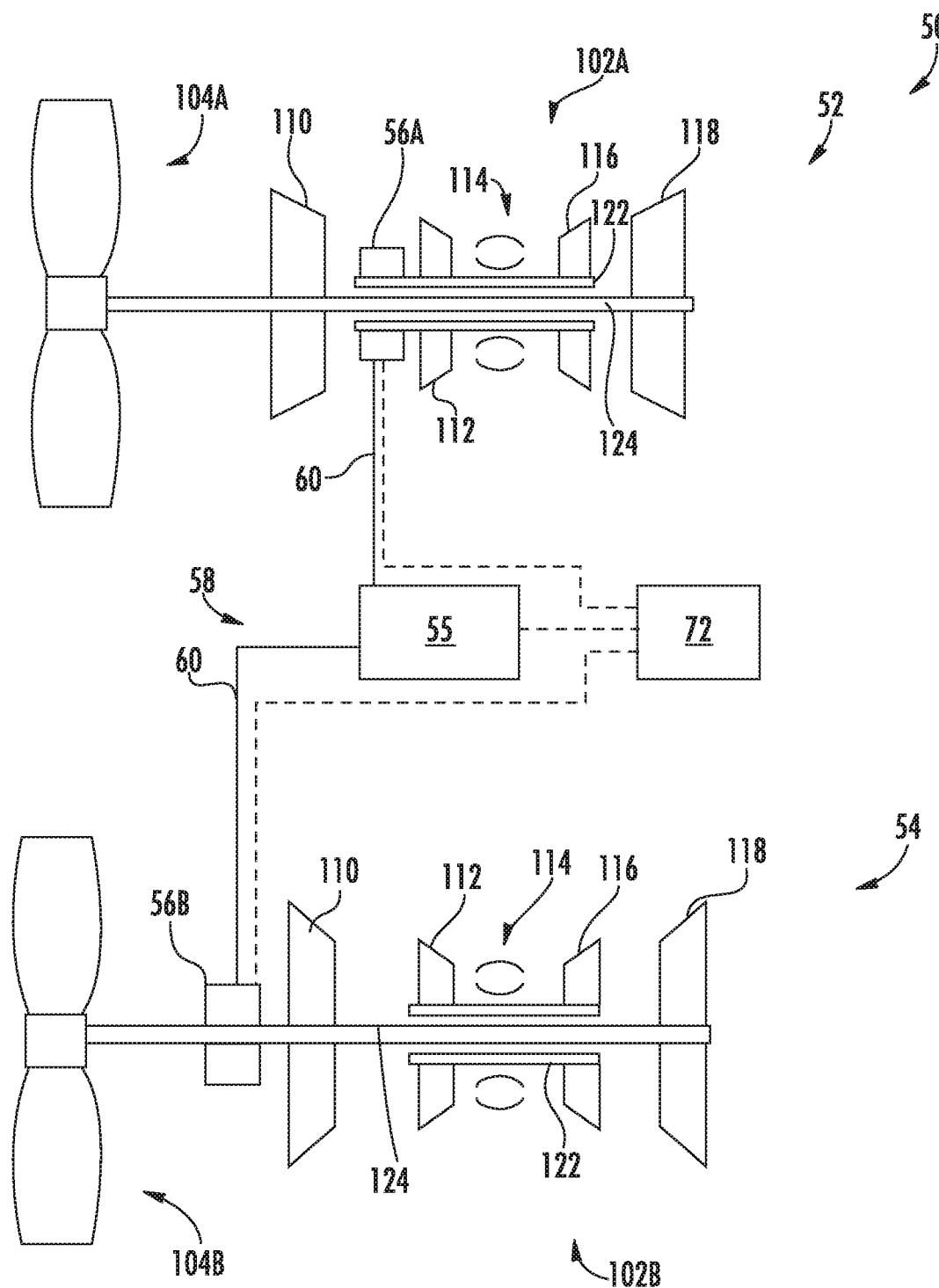
FIG. 6 is a schematic view of a propulsion system in accordance with another exemplary embodiment of the present disclosure.

For example, the exemplary hybrid-electric propulsion system 50 of FIG. 6 generally includes a first propulsor assembly 52 and a second propulsor assembly 54. The first propulsor assembly generally includes a first turbomachine 102A and a first propulsor 104A, and similarly, the second propulsor assembly 54 generally includes a second turbomachine 102B and a second propulsor 104B. Each of the first and second turbomachines 102A, 102B generally includes a low pressure system having a low pressure compressor 110 drivingly coupled to a low pressure turbine 118 through a low pressure shaft 124, as well as a high pressure system having a high pressure compressor 112 drivingly coupled to a high pressure turbine 116 through a high pressure shaft 122. Additionally, the first propulsor 104A is drivingly coupled to the low pressure system of the first turbomachine 102A and the second propulsor 104B is drivingly coupled to the low pressure system of the second turbomachine 102B. In certain exemplary embodiments, the first propulsor 104A and first turbomachine 102A may be configured as a first turbofan engine and similarly, the second propulsor 104B and second turbomachine 102B may be configured as a second turbofan engine. Alternatively, however, these components may instead be configured as parts of a turboprop engine or any other suitable turbomachine-driven propulsion device. Further, in certain exemplary embodiments, the first propulsor assembly 52 may be mounted to a first wing of an aircraft and the second propulsor assembly 54 may be mounted to a second wing of the aircraft (similar, e.g., to the exemplary embodiment of FIG. 1). Of course, in other exemplary embodiments, any other suitable configuration may be provided (e.g., both may be mounted to the same wing, one or both may be mounted to a tail of the aircraft, etc.).

Moreover, the hybrid electric propulsion system 50 of FIG. 6 additionally includes an electrical system. The electrical system includes a first electric machine 56A, a second electric machine 56B, and an electric energy storage unit 55 electrically connectable to the first electric machine 56A and second electric machine 56B. The first electric machine 56A is additionally coupled to the first turbomachine 102A. More specifically, for the embodiment depicted, the first electric machine 56A is coupled to the high pressure system of the first turbomachine 102A, and more specifically still, is coupled to the high-pressure spool 122 of the first turbomachine 102A. In such a manner, the first electric machine 56A may extract power from the high pressure system of the first turbomachine 102A and/or provide power to the high-pressure system of the first turbomachine 102A.

By contrast to the exemplary embodiments discussed above, however, the second propulsor assembly 54 is not configured as a pure electric propulsor assembly. Instead, the second propulsor assembly 54 is configured as part of a hybrid electric propulsor. More particularly, the second electric machine 56B is coupled to the second propulsor 104B, and is further coupled to the low pressure system of the second turbomachine 102B. In such a manner, the second electric machine 56B may extract power from the low pressure system of the second turbomachine 102B and/or provide power to the low pressure system of the first turbomachine 102A. More particularly, in certain exemplary aspects, the second electric machine 56 may drive, or assist with driving the second propulsor 104B.

As is also depicted in FIG. 6, the exemplary hybrid electric propulsion system 50 further includes a controller 72 and a power bus 58. The first electric machine 56A, the second electric machine 56B, and the electric energy storage unit 55 are each electrically connectable to one another through one or more electric lines 60 of the power bus 58. For example, the power bus 58 may include various switches or other power electronics movable to selectively electrically connect the various components of the hybrid electric propulsion system 50, and optionally to convert or condition such electrical power transferred therethrough.

Furthermore, it should be appreciated that in still other exemplary embodiments, the exemplary hybrid electric propulsion system 50 may have other suitable configurations. For example, although the exemplary embodiment of FIG. 6 includes a first electric machine 56A coupled to the high-pressure system of the first turbomachine 102A and the second electric machine 56B coupled to the low pressure system of the second turbomachine 102B, in other exemplary embodiments, each of the electric machines 56A, 56B may be coupled to the low pressure system, or alternatively may be coupled to the high-pressure system. Alternatively, in other exemplary embodiments the electrical system may further include an additional electric machine coupled to the low pressure system of the first turbomachine 102A and an additional electric machine coupled to the high-pressure system of the second turbomachine 102B.

Figure 7:
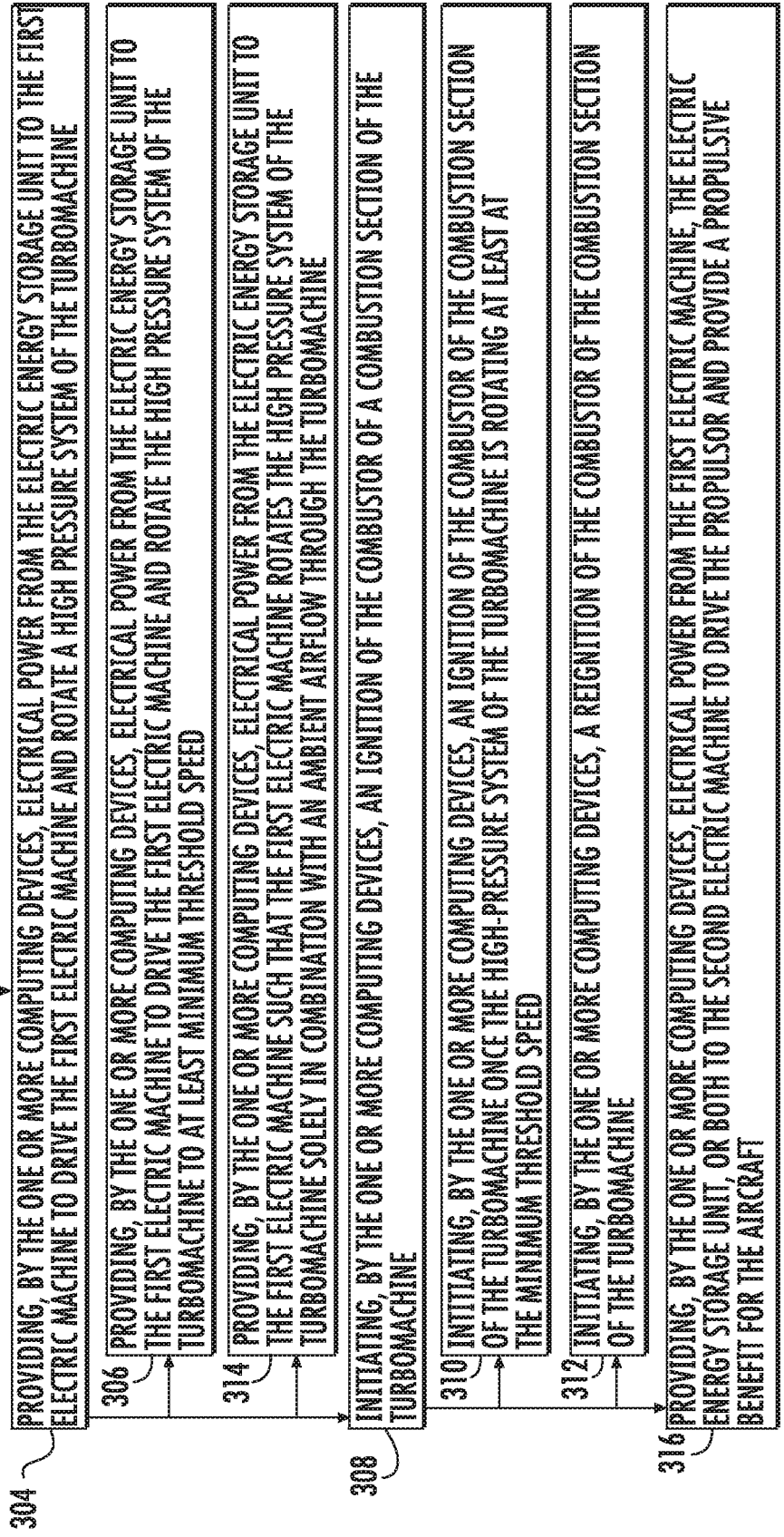
FIG. 7 is a flow diagram of a method for starting a gas turbine engine of a hybrid electric propulsion system of an aircraft in accordance with an exemplary aspect of the present disclosure.

Referring now to FIG. 7, a method 300 for starting a gas turbine engine of a hybrid electric propulsion system of an aircraft in accordance with an exemplary aspect of the present disclosure is provided. The exemplary method 300 of FIG. 7 may be utilized with one or more the exemplary hybrid electric propulsion systems described above with reference to FIGS. 1 through 6. For example, the hybrid electric propulsion system may include a propulsor, a turbomachine, and an electrical system, the electrical system including a first electric machine coupled to a high pressure system of the turbomachine, a second electric machine coupled to the propulsor, and an electric energy storage unit. For example, the turbomachine may be configured as part of a first turbofan engine and the propulsor may be configured as part of a second turbofan engine (see, e.g., FIG. 6). Additionally or alternatively, the turbomachine may be configured as part of a turbofan engine and the propulsor may be configured as part of an electric propulsor assembly (see, e.g., FIGS. 1 through 5).

The method 300 generally includes at (302) receiving, by one or more computing devices, an engine start command. The engine start command received at (302) may be an initial engine start command, or alternatively, may be an engine restart command received during a flight of the aircraft. For example, the command may be subsequent to an un-commanded engine shut down due to, e.g., an ingestion (such as bird strike or icing), an inadvertent shut down by the flight crew, etc. In certain embodiments, receiving, by one or more computing device, the engine start command during the flight of the aircraft at (302) may include receiving the engine start command from a user input device, such as a switch actuated by a pilot, or alternatively may include receiving the engine start and automatically in response to determining a shutdown condition of the turbomachine during the flight, or as part of a startup sequence.

The method 300 further includes at (304) providing, by the one or more computing devices, electrical power from the electric energy storage unit to the first electric machine to drive the first electric machine and rotate a high pressure system of the turbomachine. More specifically, for the exemplary aspect depicted, providing, by the one or more computing devices, electrical power from the electric energy storage unit to the first electric machine at (304) includes at (306) providing, by the one or more computing devices, electrical power from the electric energy storage unit to the first electric machine to drive the first electric machine and rotate the high pressure system of the turbomachine to at least a minimum threshold speed. In certain exemplary aspects, the minimum threshold speed may be within about fifty-five percent of an idle speed of the turbomachine. For example, in certain exemplary aspects, the minimum threshold speed may be within about fifty percent of the idle speed of the turbomachine, such as within about forty percent of the idle speed of the turbomachine, such as within about thirty percent of the idle speed of the turbomachine, such as within about twenty-five percent of the idle speed of the turbomachine. Notably, as used herein, the phrase "X being within about Y % of Z" refers to the "X" value being equal to the "Z" value or within "Y/100×Z" of the "Z" value.

Notably, in certain exemplary aspects, providing, by the one or more computing devices, electrical power from the electric energy storage unit to the electric machine at (304) may include providing, by the one or more computing devices, electrical power from the electric energy storage unit to the electric machine in response to receiving the engine start command at (302).

Further, the method 300 includes at (308) initiating, by the one or more computing devices, an ignition of the combustor of a combustion section of the turbomachine. More specifically, for the exemplary aspect depicted, initiating, by the one or more computing devices, the ignition of the combustor of the combustion section of the turbomachine at (308) includes at (310) initiating, by the one or more computing devices, an ignition of the combustor of the combustion section of the turbomachine once the high-pressure system of the turbomachine is rotating at least at the minimum threshold speed. For example, although not depicted, in certain exemplary aspects the method 300 may further include sensing a rotational speed of the high pressure system of the turbomachine to determine when the high pressure system of the turbomachine has reached at least the minimum threshold speed.

As mentioned above, in certain exemplary aspects of the method 300 depicted in FIG. 7, the engine start command received at (302) may be an engine restart command received during a flight of the aircraft. With such an exemplary aspect, initiating, by the one or more computing devices, the ignition of the combustor of the combustion section of the turbomachine at (308) includes at (312) initiating, by the one or more computing devices, a reignition of the combustor of the combustion section of the turbomachine. Also, with such an exemplary aspect, the exemplary method 300 may rotate the high-pressure system of the turbomachine using an ambient airflow through the turbomachine and the first electric machine, without assistance from a starter system of the gas turbine engine. More specifically, with such an exemplary aspect, providing, by the one or more computing devices, electrical power from the electric energy storage unit to the first electric machine at (304) further includes at (314) providing, by the one or more computing devices, electrical power from the electric energy storage unit to the first electric machine such that the first electric machine rotates the high pressure system of the turbomachine solely in combination with an ambient airflow through the turbomachine. Accordingly, with such an exemplary aspect, the high pressure system of the turbomachine is not rotated by any other starter system, such as a pneumatic starter powered by an auxiliary power unit or other turbomachine, and instead is powered entirely by ambient airflow through the turbomachine (also referred to as "windmilling") and the first electric machine.

Further, once the combustor the turbomachine has been ignited and the turbomachine is operating, the method 300 further includes at (316) providing, by the one or more computing devices, electrical power from the first electric machine, the electric energy storage unit, or both to the second electric machine to drive the propulsor and provide a propulsive benefit for the aircraft. For example, in certain exemplary aspects, the second electric machine may drive the propulsor and provide a thrust for the aircraft.

By driving the high pressure system of the turbomachine with the first electric machine up to at least the minimum threshold speed prior to initiating a start/ignition (or restart/reignition) of the combustor, certain undesirable conditions within the turbomachine may be avoided. For example, by driving the high pressure system of the turbomachine up to at least the minimum threshold speed prior to initiating a start, the method 300 may avoid relatively high exhaust gas temperatures within the turbomachine caused by starting, or attempting to start, the gas turbine engine while rotating at relatively low speeds (e.g., with insufficient airflow therethrough to cool off various components of the turbomachine). Additionally, using the relatively high powered electric energy storage unit and first electric machine to drive the high pressure system to at least the minimum threshold speed prior to starting/restarting the engine may increase the probability of a successful start/restart, and further may allow for a reduction in size of the fuel pump (which may be rotatable with the high pressure system).

Further, it will be appreciated that such a configuration may eliminate having to perform an unassisted start for the turbomachine, as the electric energy storage unit may be configured to maintain a sufficient charge to start the engine at all or most operating times. Such may in turn allow for a more efficiently designed turbomachine.

Figure 8:
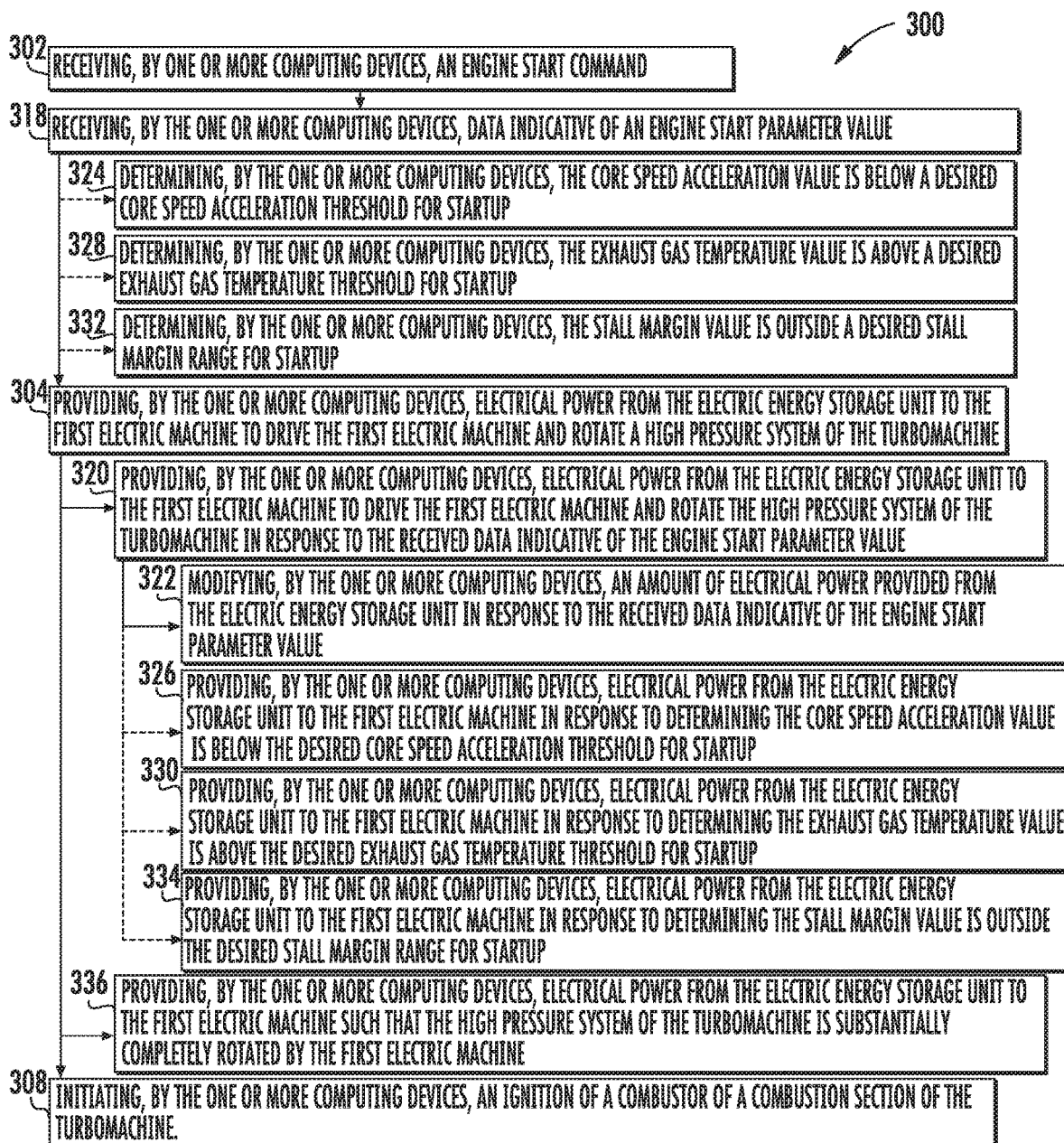
FIG. 8 is a flow diagram of a method for starting a gas turbine engine of a hybrid electric propulsion system of an aircraft in accordance with another exemplary aspect of the present disclosure.

Referring now to FIG. 8, a method 300 for starting a gas turbine engine of a hybrid electric propulsion system of an aircraft in accordance with another exemplary aspect of the present disclosure is provided. The exemplary method 300 of FIG. 8 may be similar to the exemplary method 300 of FIG. 7, and further may be utilized with one or more the exemplary hybrid electric propulsion systems described above with reference to FIGS. 1 through 6.

For example, the exemplary method 300 generally includes at (302) receiving, by one or more computing devices, an engine start command; at (304) providing, by the one or more computing devices, electrical power from the electric energy storage unit to the first electric machine to drive the first electric machine and rotate a high pressure system of the turbomachine; and at (308) initiating, by the one or more computing devices, an ignition of a combustor of a combustion section of the turbomachine.

Notably, however, it will be appreciated, that for the exemplary aspect of the method 300 depicted in FIG. 8, the method 300 is generally configured to provide an amount of electrical power based on a real-time operating condition of the turbomachine. For example, the exemplary method 300 of FIG. 8 additionally includes at (318) receiving, by the one or more computing devices, data indicative of an engine start parameter value. In certain exemplary aspects, receiving, by the one or more computing devices, data indicative of the engine start parameter value at (318) may include receiving data from one or more sensors within, or operable with, the turbomachine. In certain exemplary aspects, the engine start parameter value may be at least one of a core speed acceleration value, a core speed value, an exhaust gas temperature value, or a stall margin value. The core speed acceleration value may refer to a speed acceleration value of a high pressure system of the turbomachine, and similarly, the core speed value may refer to a speed value of the high-pressure system of the turbomachine.

Additionally, for the exemplary aspect of the method 300 depicted in FIG. 8, providing, by the one or more computing devices, electrical power from the electric energy storage unit to the first electric machine at (304) includes at (320) providing, by the one or more computing devices, electrical power from the electric energy storage unit to the first electric machine to drive the first electric machine and rotate the high pressure system of the turbomachine in response to the received data indicative of the engine start parameter value. More particularly, for the exemplary aspect depicted, providing, by the one or more computing devices, electrical power from the electric energy storage unit to the first electric machine to drive the first electric machine and rotate the high pressure system of the turbomachine in response to the received data indicative of the engine start parameter value at (320) includes at (322) modifying, by the one or more computing devices, an amount of electrical power provided from the electric energy storage unit in response to the received data indicative of the engine start parameter value. For example, the method 300 may increase or decrease an amount of electrical power provided to the first electric machine at (322).

By way of example (as is indicated in phantom), in certain exemplary aspects, the engine start parameter value may be a core speed acceleration value. With such an exemplary aspect, receiving, by the one or more computing device, data indicative of the engine start parameter value at (318) may include at (324) determining, by the one or more computing devices, the core speed acceleration value is below a desired core speed acceleration threshold for startup (e.g., the engine is starting too slow or having hit a snag). With such an exemplary aspect, providing, by the one or more computing devices, electrical power from the electric energy storage unit to the first electric machine at (320) includes at (326) providing, by the one or more computing devices, electrical power from the electric energy storage unit to the first electric machine in response to determining the core speed acceleration value is below the desired core speed acceleration threshold for startup.

For example, although not depicted, in certain exemplary aspects, providing, by the one or more computing devices, electrical power from the energy storage unit to the first electric machine at (326) may include increasing an amount of electrical power provided to the first electric machine in response to determining the core speed acceleration value is below the desired core speed acceleration threshold for startup. More specifically, in one exemplary aspect, the core speed acceleration threshold may be zero, such that such that the method 300 provides electrical power from the electric energy storage unit to the first electric machine (or increases an amount of power provided to the first electric machine from the electric energy storage unit) when an acceleration of, e.g., a core of the turbomachine falls below zero. For example, in certain exemplary aspects, the aircraft may include an auxiliary power unit driving a starter motor, and the acceleration of the high pressure system of the turbomachine may drop when the starter motor shuts off. With such an exemplary embodiment, the method 300 may activate the electric machine with the electric energy storage unit to reduce a start time of the turbomachine.

Notably, however, it should be appreciated that the exemplary method 300 may further, in certain exemplary aspects, decrease an amount of electrical power provided to the first electric machine, e.g., in response to determining that the core speed acceleration is above a minimum threshold. Such may allow for the system 300 to conserve electrical power if desired.

Additionally, in other exemplary aspects (as is also depicted in phantom), the engine start parameter value may be an exhaust gas temperature value. With such an exemplary aspect, receiving, by the one or more computing device, data indicative of the engine start parameter value at (318) may include at (328) determining, by the one or more computing devices, the exhaust gas temperature value is above a desired exhaust gas temperature threshold for startup. With such an exemplary aspect, providing, by the one or more computing devices, electrical power from the electric energy storage unit to the first electric machine at (320) includes at (330) providing, by the one or more computing devices, electrical power from the electric energy storage unit to the first electric machine in response to determining the exhaust gas temperature value is above the desired exhaust gas temperature threshold for startup.

For example, although not depicted, in certain exemplary aspects, providing, by the one or more computing devices, electrical power from the energy storage unit to the first electric machine at (330) may include increasing an amount of electrical power provided to the first electric machine in response to determining the exhaust gas temperature value is above the desired exhaust gas temperature threshold for startup. In one exemplary aspect, for example, when a startup of the turbomachine is particularly slow, a high pressure system of the turbomachine may not include sufficient airflow to maintain the exhaust gas temperature below the exhaust gas temperature threshold. The exhaust gas temperature threshold may be a temperature limit for the particular materials, or alternatively, may be a lower threshold designed to maintain longevity for the particular materials. Accordingly, when the method 300 determines the exhaust gas temperature is above the exhaust gas temperature threshold at (328), the method 300 may activate the first electric machine to add power to the high pressure system (or increase an amount of power provided from the electric energy storage unit to the first electric machine), increasing a speed of the high pressure system to reduce a startup time and provide additional air flow therethrough to reduce the exhaust gas temperature.

Notably, however, it should be appreciated that the exemplary method 300 may further, in certain exemplary aspects, decrease an amount of electrical power provided to the first electric machine, e.g., in response to determining that the exhaust gas temperature is below a certain threshold. Such may allow for the system 300 to conserve electrical power if desired.

Moreover, in still other exemplary aspects, the engine start parameter value may be a stall margin value. With such an exemplary aspect, receiving, by the one or more computing device, data indicative of the engine start parameter value at (318) may include at (332) determining, by the one or more computing devices, the stall margin value is outside a desired stall margin range for startup. With such an exemplary aspect, providing, by the one or more computing devices, electrical power from the electric energy storage unit to the first electric machine at (320) includes at (334) providing, by the one or more computing devices, electrical power from the electric energy storage unit to the first electric machine in response to determining the stall margin value is outside the desired stall margin range for startup. For example, although not depicted, in certain exemplary aspects, providing, by the one or more computing devices, electrical power from the energy storage unit the first electric machine at (332) may include increasing an amount of electrical power provided to the first electric machine in response to determining the stall margin value is outside the desired stall margin range for startup.

For example, when during startup of the turbomachine, various operational parameters of the turbomachine indicate that the stall margin for the turbomachine is below a desired threshold, the method 300 may provide electrical power from the electric energy storage unit to the first electric machine to activate the first electric machine and add power to the high pressure system of the turbomachine, increasing a stall margin of the turbomachine (or alternatively, may increase an amount of electrical power provided from the electric energy storage unit to the first electric machine). It will be appreciated that providing electrical power to the first electric machine may not directly increase the stall margin of the turbomachine, but instead may allow actions that increase the stall margin. For example, in at least certain embodiments, providing electrical power to the first electric machine may allow for acceleration to be maintained while a fuel flow to a combustion section of the turbomachine is reduced, which typically increases the stall margin. Additionally, or alternatively, providing electrical power to the first electric machine may drive the turbomachine to a higher speed, which typically allows the turbomachine to inherently gain stall margin.

Notably, however, in other exemplary aspects, the engine start parameter value may be the value of any other suitable engine parameter. For example, in other exemplary aspects, the engine start parameter value may be a value of an internal pressure within the turbomachine, a state of charge of the electric energy storage unit, etc.

From the present disclosure, it should be appreciated that in certain exemplary aspects, the method 300 may provide an amount of electrical power, or rather modulate an amount of electrical power provided, to the first electric machine as a function of the engine start parameter value, and not simply based on the engine start parameter being above or below a certain threshold. Additionally, this provision or modulation of electrical power provided may not necessarily occur prior to initiating, by the one or more computing devices, the ignition of the combustor of the combustion section of the turbomachine at (308) (as is depicted in FIG. 8), and instead one or more of these aspects (i.e., (322), (326), (330), and (334)) may additionally, or alternatively occur subsequent to, or simultaneously with, initiating, by the one or more computing devices, the ignition of the combustor of the combustion section of the turbomachine at (308).

Notably, referring still to the exemplary method 300 of FIG. 8, in certain of these exemplary aspects, the method 300 may include utilizing the first electric machine and electric energy storage unit to supplement an existing starter for the turbomachine. However, in other of these exemplary aspects, the electric machine and electric energy storage unit of the hybrid electric propulsion system may be configured as a main (and only) starter for the turbomachine. For example, referring still to FIG. 8, providing, by the one or more computing devices, electrical power from the electric energy storage unit to the first electric machine at (304) includes at (336) providing, by the one or more computing devices, electrical power from the electric energy storage unit to the first electric machine such that the high pressure system of the turbomachine is substantially completely rotated by the first electric machine and (in the case of a mid-flight start/re-start) ambient airflow through the engine core. Accordingly, with such an exemplary aspect, the hybrid electric propulsion system may not need a supplemental starter, such as starter motor or a pneumatic starter, powered by an auxiliary power unit, in order to start the turbomachine.

It will be appreciated that operating a hybrid electric propulsion system in accordance with one or more of these exemplary embodiments may allow for the hybrid electric propulsion system to conserve electrical power during certain starting operations if desired.

Figure 9:
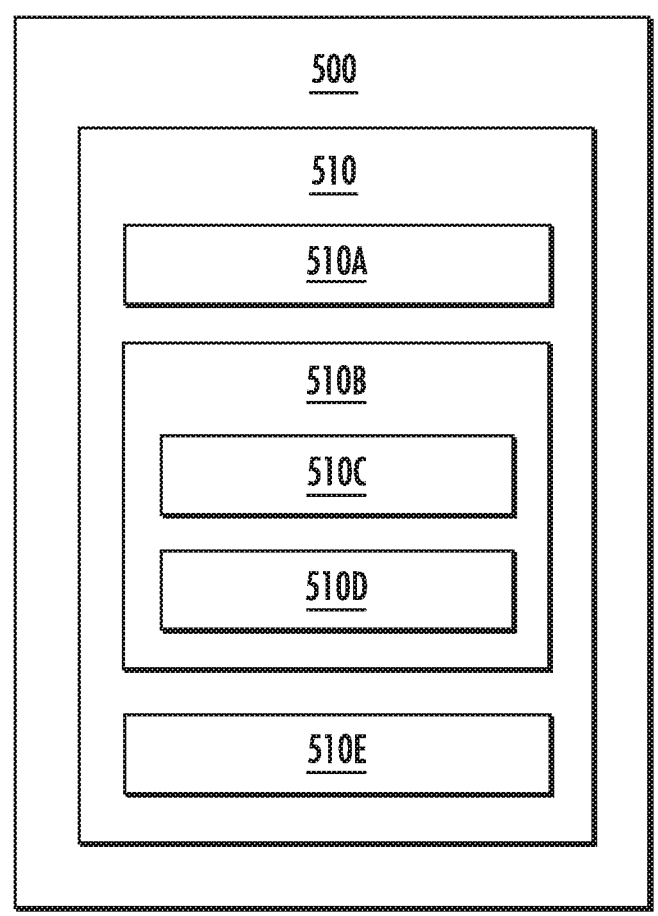
FIG. 9 is a computing system according to example aspects of the present disclosure.

Referring now to FIG. 9, an example computing system 500 according to example embodiments of the present disclosure is depicted. The computing system 500 can be used, for example, as a controller 72 in a hybrid electric propulsion system 50. The computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, the operations for starting a turbomachine (e.g, method 300), as described herein, and/or any other operations or functions of the one or more computing device(s) 510. Accordingly, the method 300 may be computer-implemented methods. The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include data indicative of power flows, data indicative of power demands of various loads in a hybrid electric propulsion system, data indicative of operational parameters of the hybrid electric propulsion system, including of a turbomachine of the hybrid electric propulsion system.

The computing device(s) 510 can also include a network interface 510E used to communicate, for example, with the other components of system 500 (e.g., via a network). The network interface 510E can include any suitable components for interfacing with one or more network(s), including for example, transmitters, receivers, ports, controllers, antennas, and/or other suitable components. One or more external display devices (not depicted) can be configured to receive one or more commands from the computing device(s) 510.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A hybrid-electric propulsion system for an aircraft comprising:
   a propulsor;
   a turbomachine comprising a high pressure turbine drivingly coupled to a high pressure compressor through a high pressure spool;
   an electrical system comprising a first electric machine, a second electric machine, and an electric energy storage unit electrically connectable to the first and second electric machines, the first electric machine coupled to the high pressure spool of the turbomachine and the second electric machine coupled to the propulsor for driving the propulsor to provide a propulsive benefit for the aircraft; and a controller configured to provide electrical power from an electric power source to the first electric machine to drive the first electric machine to start, or assist with starting, the turbomachine when an acceleration of the high pressure spool falls below zero.

2. The hybrid-electric propulsion system of claim 1, wherein the turbomachine is configured as part of a first turbofan engine, and wherein the propulsor is configured as part of a second turbofan engine.

3. The hybrid-electric propulsion system of claim 1, wherein the turbomachine is configured as part of a turbofan engine, and wherein the propulsor is configured as part of an electric propulsor assembly.

4. The hybrid-electric propulsion system of claim 1, wherein the high pressure turbine and the high pressure compressor at least partially define a core air flowpath, and wherein the first electric machine is positioned inward of the core air flowpath.

5. The hybrid-electric propulsion system of claim 1, wherein the electric power source is the electric energy storage unit, wherein the electric energy storage unit is selectively in electrical communication with both the first electric machine and the second electric machine.

6. The hybrid-electric propulsion system of claim 1, wherein the controller is further configured to extract electrical power from the first electric machine during operation of the turbomachine, wherein the electric energy storage unit is configured to store at least about fifty kilowatt-hours of electrical power, and wherein the first electric machine is configured to generate at least about fifty kilowatts during operation of the turbomachine.

7. The hybrid-electric propulsion system of claim 1, wherein the electric energy storage unit is configured to store at least about sixty-five kilowatt-hours of electrical power.

8. A method for starting a turbomachine of a hybrid-electric propulsion system of an aircraft, the hybrid-electric propulsion system comprising a propulsor, a turbomachine, and an electrical system, the electrical system comprising a first electric machine coupled to a high pressure system of the turbomachine, a second electric machine coupled to the propulsor, and an electric energy storage unit, the method comprising:

receiving, by one or more computing devices, an engine start command;

providing, by the one or more computing devices, electrical power from the electric energy storage unit to the first electric machine to drive the first electric machine and rotate a high pressure system of the turbomachine to at least a minimum threshold speed, wherein the minimum threshold speed is within about fifty-five percent of an idle speed of the turbomachine;

initiating, by the one or more computing devices, an igniting of a combustor of a combustion section of the turbomachine once the high pressure system of the turbomachine is rotating at least at the minimum threshold speed; and providing, by the one or more computing devices, electrical power from the electric energy storage unit to the second electric machine to drive the propulsor and provide a propulsive benefit for the aircraft.

9. The method of claim 8, wherein the engine start command is an engine restart command.

10. The method of claim 9, wherein providing, by the one or more computing devices, electrical power from the electric energy storage unit to the first electric machine comprises providing, by the one or more computing devices, electrical power from the electric energy storage unit to the first electric machine such that the first electric machine rotates the high pressure system of the turbomachine solely in combination with an ambient airflow through the turbomachine.

11. The method of claim 8, wherein the electric energy storage unit is configured to store at least about fifty kilowatt hours of electrical power.

12. A method for starting a turbomachine of a hybrid-electric propulsion system of an aircraft, the hybrid-electric propulsion system comprising a propulsor, a turbomachine, and an electrical system, the electrical system comprising a first electric machine coupled to a high pressure system of the turbomachine, a second electric machine coupled to the propulsor, and an electric energy storage unit, the method comprising:

receiving, by one or more computing devices, an engine start command;

receiving, by the one or more computing devices, data indicative of an engine start parameter value, wherein the engine start parameter value is at least one of an exhaust gas temperature value or a stall margin value;

providing, by the one or more computing devices, electrical power from the electric energy storage unit to the first electric machine to drive the first electric machine and rotate the high pressure system of the turbomachine in response to the received data indicative of the engine start parameter value; and initiating, by the one or more computing devices, an igniting of a combustor of a combustion section of the turbomachine.

13. The method of claim 12, wherein providing, by the one or more computing devices, electrical power from the electric energy storage unit to the first electric machine comprises modifying, by the one or more computing devices, an amount of electrical power provided from the electric energy storage unit to the first electric machine to drive the first electric machine and rotate the high pressure system of the turbomachine in response to the received data indicative of the engine start parameter value.

14. The method of claim 12, wherein receiving, by the one or more computing devices, data indicative of the engine start parameter value comprises determining, by the one or more computing devices, further includes determining a core speed acceleration value is below a desired core speed acceleration threshold for startup, and wherein providing, by the one or more computing devices, electrical power from the electric energy storage unit to the first electric machine comprises providing, by the one or more computing devices, electrical power from the electric energy storage unit to the first electric machine in response to determining the core speed acceleration value is below the core speed acceleration threshold for startup.

15. The method of claim 12, wherein receiving, by the one or more computing devices, data indicative of the engine start parameter value comprises determining, by the one or more computing devices, the exhaust gas temperature value is above a exhaust gas temperature threshold for startup, and wherein providing, by the one or more computing devices, electrical power from the electric energy storage unit to the first electric machine comprises providing, by the one or more computing devices, electrical power from the electric energy storage unit to the first electric machine in response to determining the exhaust gas temperature value is above the core speed acceleration threshold for startup.

16. The method of claim 12, wherein receiving, by the one or more computing devices, data indicative of the engine start parameter value comprises determining, by the one or more computing devices, the stall margin value is outside a stall margin range for startup, and wherein providing, by the one or more computing devices, electrical power from the electric energy storage unit to the first electric machine comprises providing, by the one or more computing devices, electrical power from the electric energy storage unit to the first electric machine in response to determining the stall margin is outside the stall margin range for startup.

17. The method of claim 12, wherein providing, by the one or more computing devices, electrical power from the electric energy storage unit to the first electric machine comprises providing, by the one or more computing devices, electrical power from the electric energy storage unit to the first electric machine such that the high pressure system of the turbomachine is completely rotated by the first electric machine.

18. The method of claim 12, further comprising:
providing, by the one or more computing devices, electrical power from the electric energy storage unit to the second electric machine to drive the propulsor and provide a propulsive benefit for the aircraft.

* * * * *